US006144468A

United States Patent [19]
Watanabe

[11] Patent Number: 6,144,468

[45] Date of Patent: Nov. 7, 2000

[54] IMAGE FORMING SYSTEM INCLUDING A PRINTER AND SCANNER HAVING SEPARATE HOUSINGS

[75] Inventor: Atsushi Watanabe, Tokyo, Japan

[73] Assignee: Ricoh Company, Ltd., Tokyo, Japan

[21] Appl. No.: 09/143,651

[22] Filed: Aug. 31, 1998

Related U.S. Application Data

[63] Continuation of application No. 08/537,334, Oct. 2, 1995, Pat. No. 5,956,160.

[30] Foreign Application Priority Data

Apr. 25, 1995 [JP] Japan .................................... 7-100883
Apr. 26, 1995 [JP] Japan .................................... 7-206835
Apr. 26, 1995 [JP] Japan .................................... 7-206836

[51] Int. Cl.[7] ..................................................... H04N 1/04
[52] U.S. Cl. ........................... 358/496; 358/401; 358/419
[58] Field of Search .................................. 358/496, 400, 358/401, 406, 419, 442, 296; 347/108, 138, 152, 170, 222, 245, 263

[56] References Cited

U.S. PATENT DOCUMENTS 5,573,425  11/1996  Morisawa et al. ....................... 439/502
5,600,445   2/1997  Omi ........................................ 358/401

*Primary Examiner*—Thomas D. Lee
*Attorney, Agent, or Firm*—Oblon, Spivak, McClelland, Maier & Neustadt, P.C.

[57] ABSTRACT

An image forming system including a printer unit connected to a scanner unit, each having their own housing. The scanner unit includes a display for displaying the states including error conditions of both the scanner unit as well as the printer unit. A user interface of the scanner unit inputs operation parameters and commands for the entire image forming system. The printer section includes an LED display section for displaying errors and the status of the printer unit. The printer unit and scanner unit are connected to each other using a single integrated cable.

12 Claims, 14 Drawing Sheets

F I G. 2
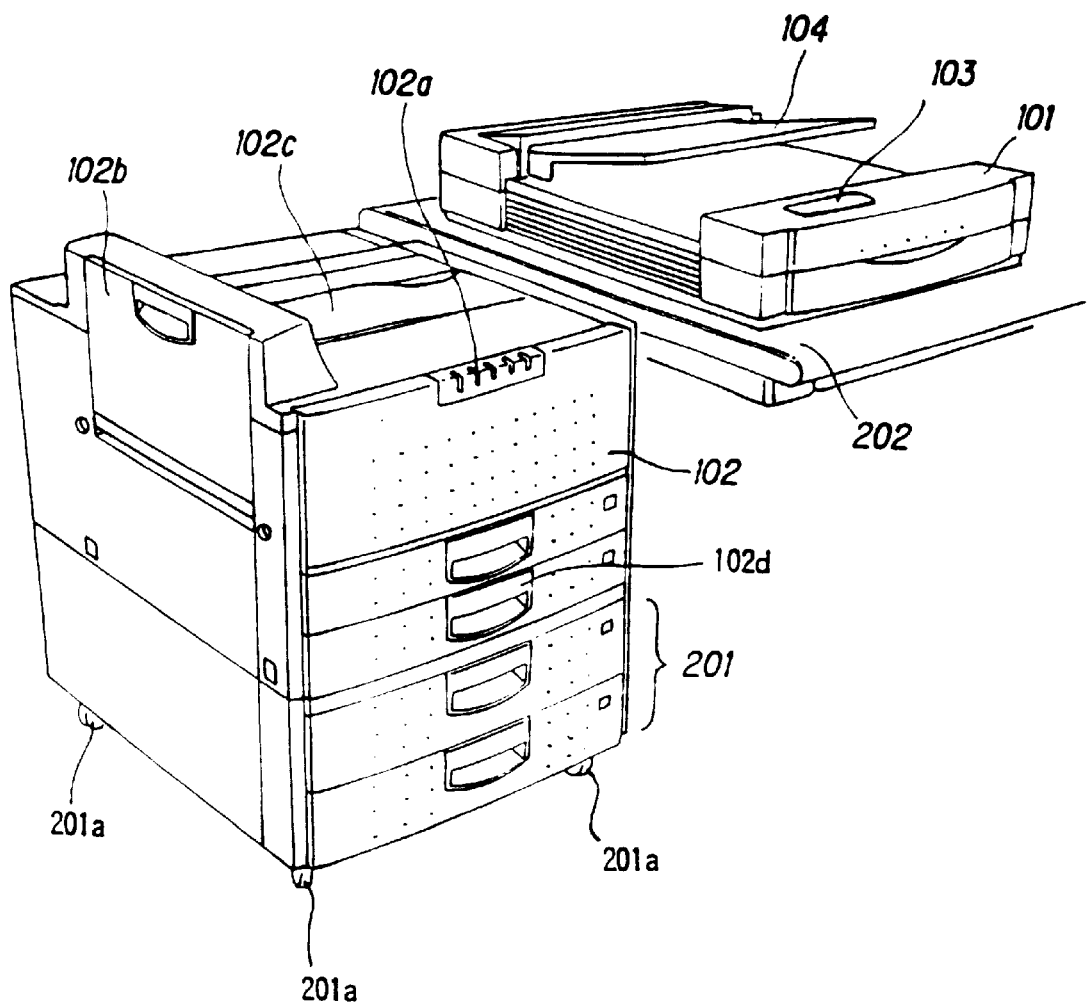

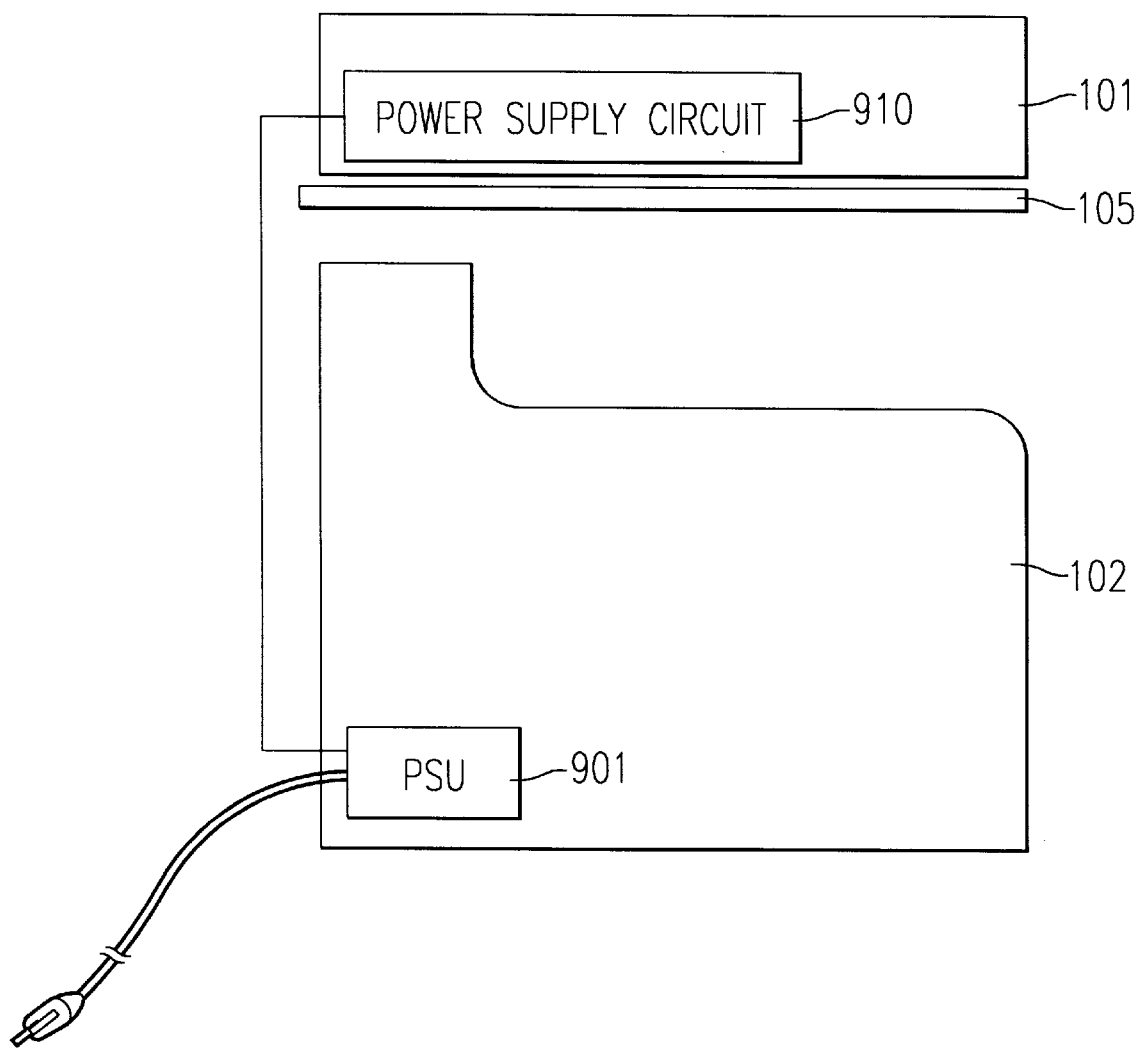

F I G. 1 2 A
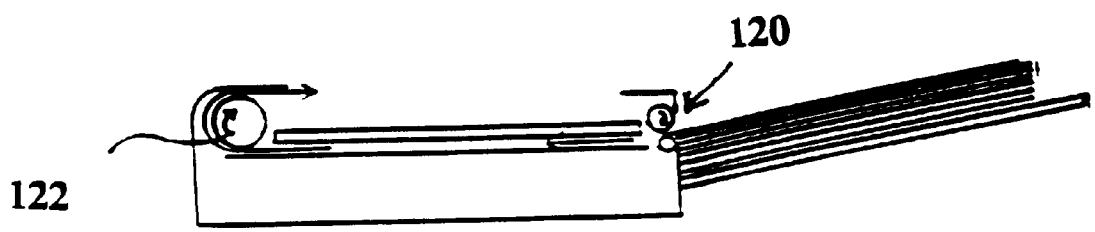
F I G. 1 2 B
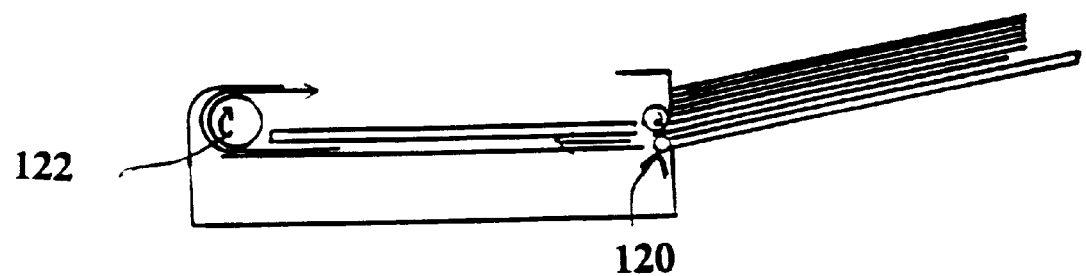

IMAGE FORMING SYSTEM INCLUDING A PRINTER AND SCANNER HAVING SEPARATE HOUSINGS

CROSS-REFERENCES TO RELATED APPLICATIONS

This application is a Continuation of application Ser. No. 08/537,334, filed Oct. 2, 1995, now allowed. U.S. Pat. No. 5,956,160.

This application is related to commonly owned, co-pending application 08/537,332 concurrently filed on Oct. 2, 1995, entitled "IMAGE FORMING SYSTEM IN WHICH A PRINTED PAPER DISCHARGE TRAY IS SELECTED BASED ON THE CHARACTERISTICS OF AN AUTOMATIC DOCUMENT FEEDER", which is incorporated herein by reference.

BACKGROUND OF THE INVENTION

1. Field of the Invention

The present invention relates to an image forming system comprising a scanner unit for optically reading a document image, a printer unit for forming an image on recording paper, and a control unit for controlling the scanner unit as well as printer unit, and more specifically to an image forming system in which the scanner unit and printer unit are accommodated in different housings.

2. Background of the Invention

There has been provided a digital copier, as a conventional type of image forming apparatus, wherein, for instance, a scanner unit for optically reading a document image and a printer unit for forming an image on recording paper each are accommodated in different housings respectively, and an operation display section is incorporated in either of the two housings.

With the conventional technology described above, although a scanner unit and a printer unit are accommodated in different housings, an operation display section for displaying an error and status is provided in only one of the two housings. Therefore, when checking the operation display section for error or status information, it is necessary to make sure the information is for the desired housing or unit. Further, if a housing or unit is an object for error or status checking is separated from an operation display section, there has been a problem associated with inconvenience in use thereof.

Also when a scanner unit and a printer unit are accommodated in different housings respectively, a power source unit (PSU) has to be provided in both housings, so that there have been such problems as cost increase for the apparatus and inconvenience of providing a plurality of external power supply units.

Also, a power cable, a cable for connecting a signal cable for communicating video data, and a serial communication cable are each required to connect the scanner unit to the printer unit. Therefore, the connection cabling becomes complicated which makes the system appear cluttered and reduces the appearance.

SUMMARY OF THE INVENTION

Accordingly, it is an object of the present invention to provide easy discrimination of a unit which is an object of error or status checking and to improve the convenience of an image forming system in which a scanner unit and a printer unit are accommodated in different housings.

It is another object of the present invention to avoid a cost increase for a system and inconvenience of providing a plurality of external power supply units in the image forming system in which a scanner unit and a printer unit are accommodated in different housings.

It is a further object of the present invention to connect easily a scanner unit to a printer unit having different housings and provide a connection therebetween having a better appearance.

The image forming system of the present invention is a system in which a printer unit and a scanner unit are accommodated in different housings. In the system, the scanner unit displays error and status information of the printer unit so that a user can learn a state of the entire image forming system by only checking the scanner unit.

Also in the image forming system of the present invention, a display for displaying an error in and status of the printer unit is provided in the printer unit so that an error in and status of the printer unit can be studied by viewing the printer unit, thus allowing an error or status to be easily determined and to improve the convenience thereof.

Also in the image forming system of the present invention, an operation display for controlling the operation of the printer unit is provided in the scanner unit so that the operation and input of the entire image forming system can be executed by the operation display located in the scanner unit, and convenience thereof can be improved.

Other objects and features of this invention will become understood from the following description with reference to the accompanying drawings.

BRIEF DESCRIPTION OF THE DRAWINGS

FIG. 2 is a perspective view of an alternative arrangement of the image forming system according to the present invention;

FIG. 9 is an explanatory view showing the location of a power source unit (PSU) in the image forming system according to the present invention;

FIG. 12A illustrates a straight path automatic document feeder which feeds paper from the top of a stack;

FIG. 12B illustrates a straight path document feed which feeds paper from the bottom of a stack;

DETAILED DESCRIPTION OF THE PREFERRED EMBODIMENTS

Figure 1:
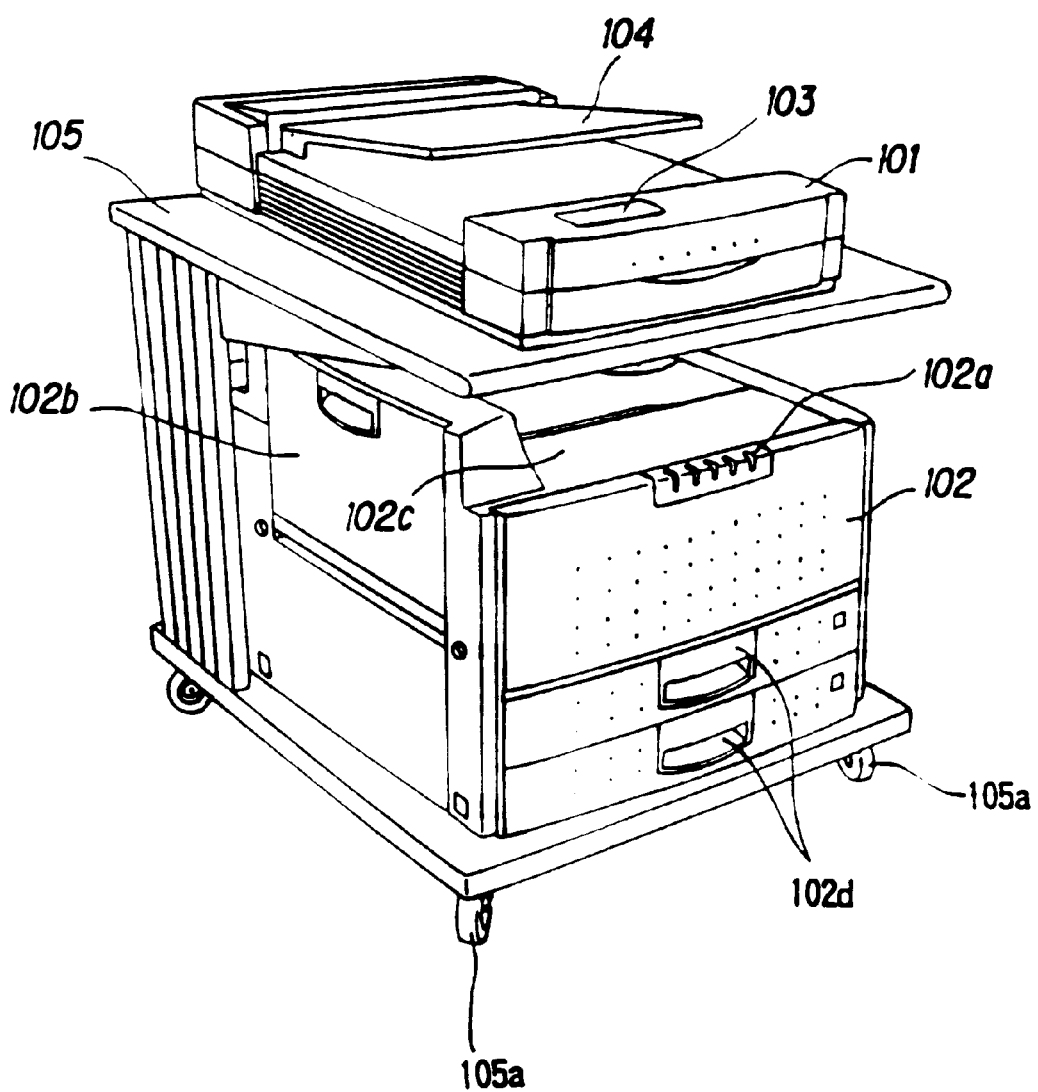
FIG. 1 is a perspective view of an image forming system according to the present invention.

Referring now to the drawings wherein like reference numerals designate identical or corresponding parts throughout the several views and more particularly to FIG. 1 thereof, there is illustrated an image forming system including a scanner unit 101 for optically reading a document image and a printer unit 102 for forming an image on recording paper. Each of the printer unit 101 and scanner unit 102 having their own housing. The image forming system of the present invention has such functions as a copying function, a facsimile function, a local printer function, and a network printer function, or the like.

The scanner unit 101 includes an operation display section 103 (a user interface) for displaying an error in and status of the scanner unit 101 and printer unit 102. The operation display section 103 is also for inputting data for the entire image forming system. The scanner unit 131 further includes an automatic document feeder 104 (called an ADF hereinafter) for feeding a document page by page to a prespecified scanning position for reading an image by the scanner unit 101. By having the operation display section 103 as part of the scanner unit and allowing it to display information of both the scanner unit 101 and the printer unit 102, the user can learn the state of the entire image forming system by only checking the display of the scanner unit.

The printer unit 102 includes a LED display section 102a for displaying an error in and status of the printer unit 102. The display section 102a may alternatively be an alphanumeric LED or LCD display. By having the status of the printer unit displayed on the printer unit itself, the status of the printer unit can be easily determined. The printer unit 102 further includes a face-up paper discharge tray 102b provided on the side of the housing of the printer unit 102, and a face-down paper discharge tray 102c provided on the top of the housing of the printer unit 102. The printer unit 102 includes drawing handles 102d for drawing a paper supply cassette from the printer unit 102 on a same side as the operation display section 103 of the scanner unit 101. This allows the paper supply cassette of the printer unit 102 to be handled at the same side as the operation display section 103 of the scanner unit 101 and for this reason, high-workability is achieved.

FIG. 1 shows an example of a system configuration where the scanner unit 101 and printer unit 102, each accommodated in different housings, are located on and under a table 105 which is a mounting/supporting device. FIG. 2 shows an example of an alternative configuration where a paper supply unit 201 is added to the lower side of the printer unit 102, and the scanner unit 101 is mounted on a shelf 202. As shown in FIG. 2, the printer unit 102 and the scanner unit 101 can be located apart from each other, so that high-flexibility of the system layout of different locations is achieved.

Casters 105a (FIG. 1) or 201a (FIG. 2) function as moving devices for freely moving the system or printer unit on the floor are provided at the bottom side of the table 105 and the paper supply unit 201. The location of the scanner unit 101 and printer unit 102 can easily be changed by using the caster 105a and 201a. Furthermore, although not shown in the figures, casters can be provided at the bottom side of the printer unit 102.

In FIG. 1, the scanner unit 101 is located on the table 105, and the printer unit 102 is located under the table. In this arrangement, the scanner unit 101 is located at a higher position than the printer unit 102 so that operability of the operation display section 103 can be performed and the improvement of workability can be enhanced.

Figure 3:
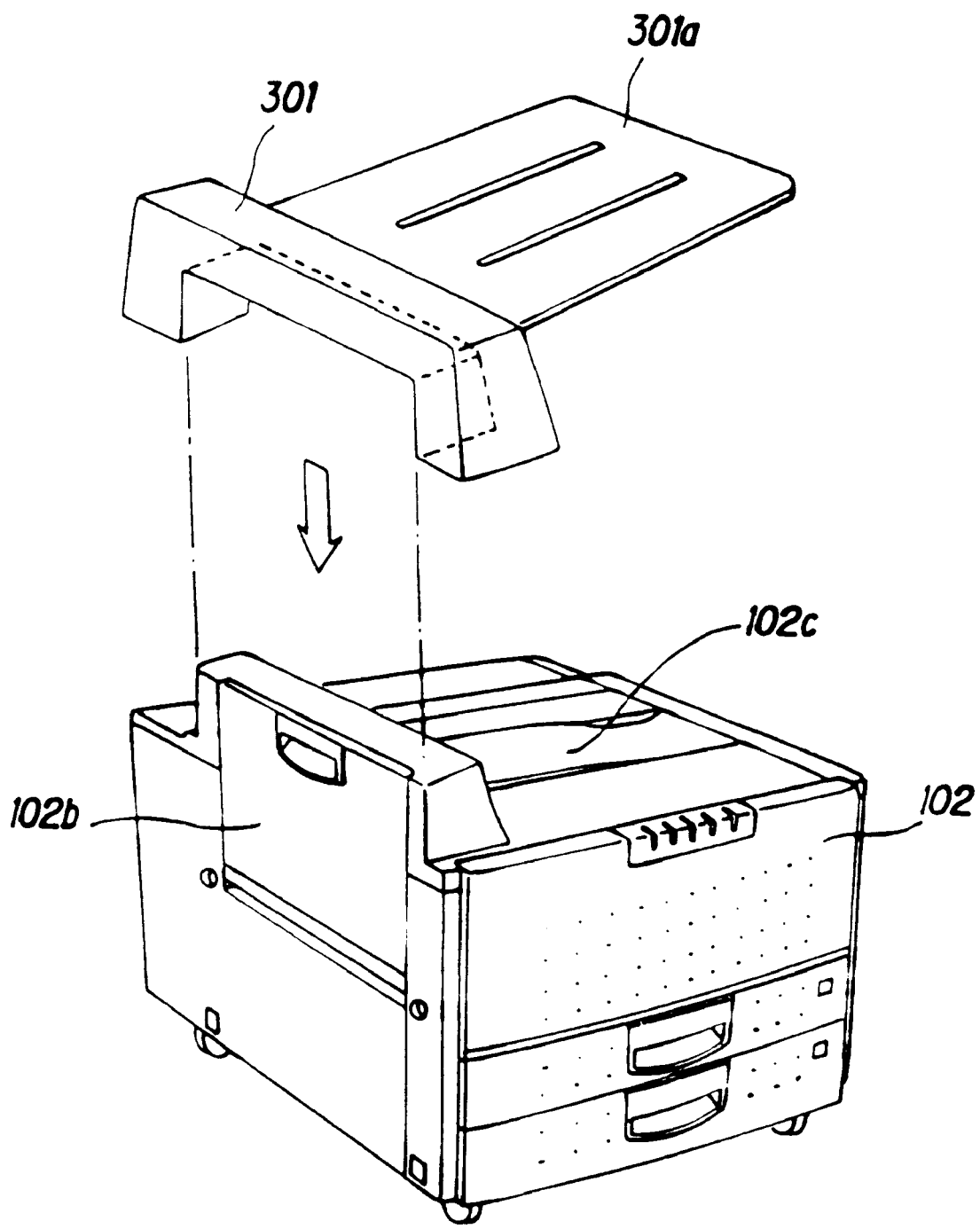
FIG. 3 is a perspective view of the printer unit according to the present invention.
Figure 4:
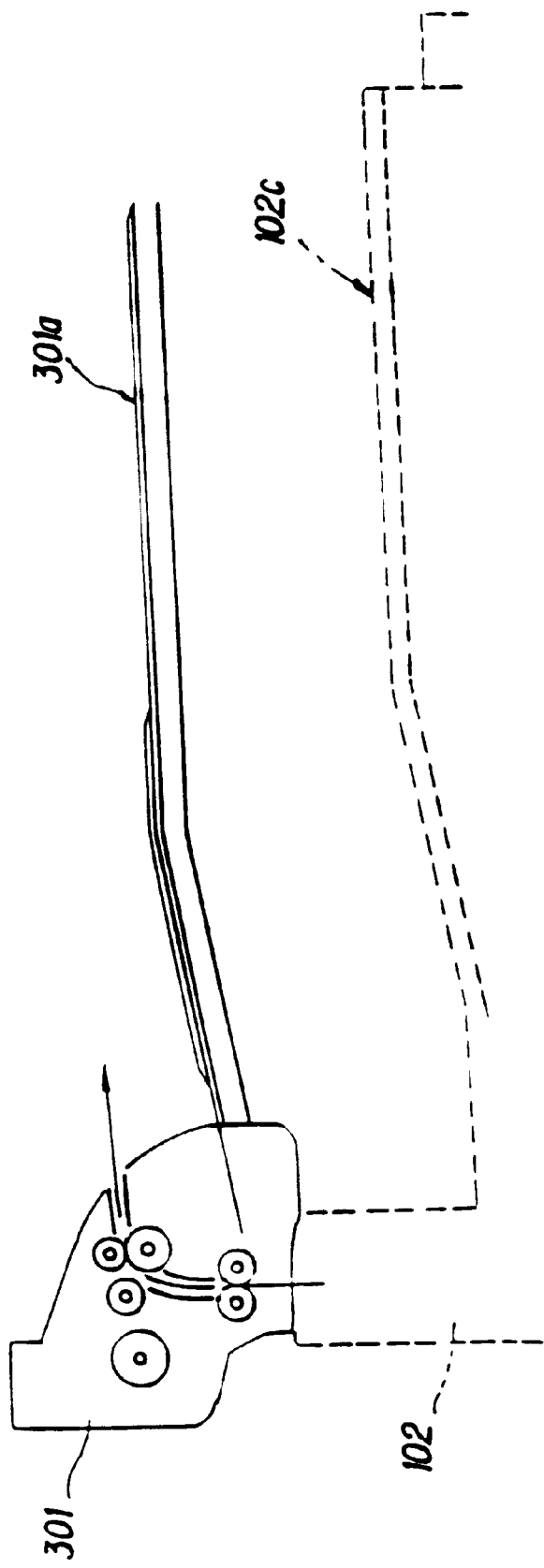
FIG. 4 is a cross-sectional view showing the general configuration of a paper discharge unit of the printer unit.

FIG. 3 illustrates the printer unit 102 and a paper discharge unit 301 having a face-down paper discharge tray 301a for mounting on the upper side of the printer unit 102. This gives the printer unit two stages of face-down paper discharge so that either of the trays 102c and 301a can be used to hold discharged recording sheets. FIG. 4 shows the general configuration of the paper discharge unit 301. Rollers within the paper discharge unit recording paper feed the printed paper face-down to the paper discharge tray 301a.

Figure 6:
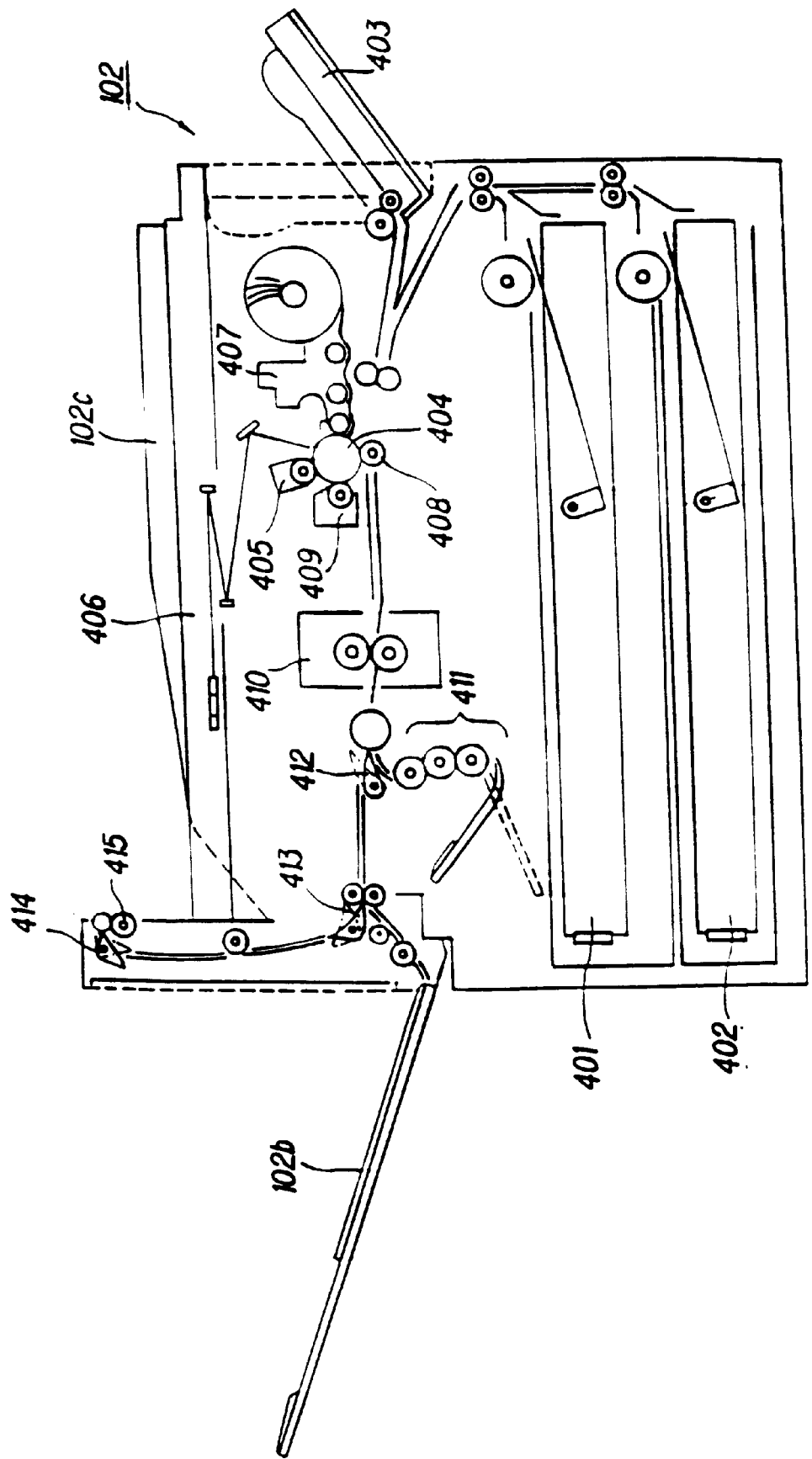
FIG. 6 is a cross-sectional view showing the general configuration of a printer unit according to the present invention.

FIG. 6 shows the general configuration of the printer unit 102 which includes paper supply units 401 and 402 for supplying recording paper page by page, a tray 403 for hand-feeding used when recording paper is supplied manually or by hand, a photosensitive drum 404 which is an image carrier, a charge roller 405 for homogeneously charging the photosensitive drum 404, a laser writing section 406 for forming an electrostatic latent image on the photosensitive drum 404, a developing device 407 for developing the electrostatic latent image by applying toner to the photosensitive drum 404, a transfer roller 408 for transferring a toner image formed on the photosensitive drum 404 onto a supplied page of recording paper, a cleaning device 409 for removing toner remaining on the photosensitive drum after transferring the toner image, a fixing device 410 for fixing the toner image to the recording paper, a feed path 411 for introducing recording paper to a double-sided paper supply unit (not shown) when an image is formed on both sides of recording paper, a paper diverter 412 for selecting a feed path depending on whether recording paper should be discharged or fed to the feed path 411, a paper diverter 413 for selecting a feed path depending on whether the destination to which recording paper is to be discharged is a face-up paper discharge tray 102b or a face-down paper discharge tray, and a paper diverter 414 for selecting a feed path depending on which of the face-down paper discharge trays 102c and 301a recording paper is discharged to when the paper discharge unit 301 is added thereto. When recording paper is discharged to the face-up paper discharge tray 102b, the paper is not reversed, and when recording paper is discharged to either of the face-down paper discharge trays 102c and 301a, the recording paper is reversed and discharged using the paper discharge roller 415.

It should be noted that although a double-sided paper supply unit is not shown in FIG. 6, if a double-sided paper supply unit is incorporated therein, it can be located at the position of the paper supply cassette 401. Recording paper will be fed from the feed path 411 to the double-sided paper supply unit, reversed inside the double-sided paper supply unit, and supplied again to the feed path from the side of developing device 407.

Figure 5:
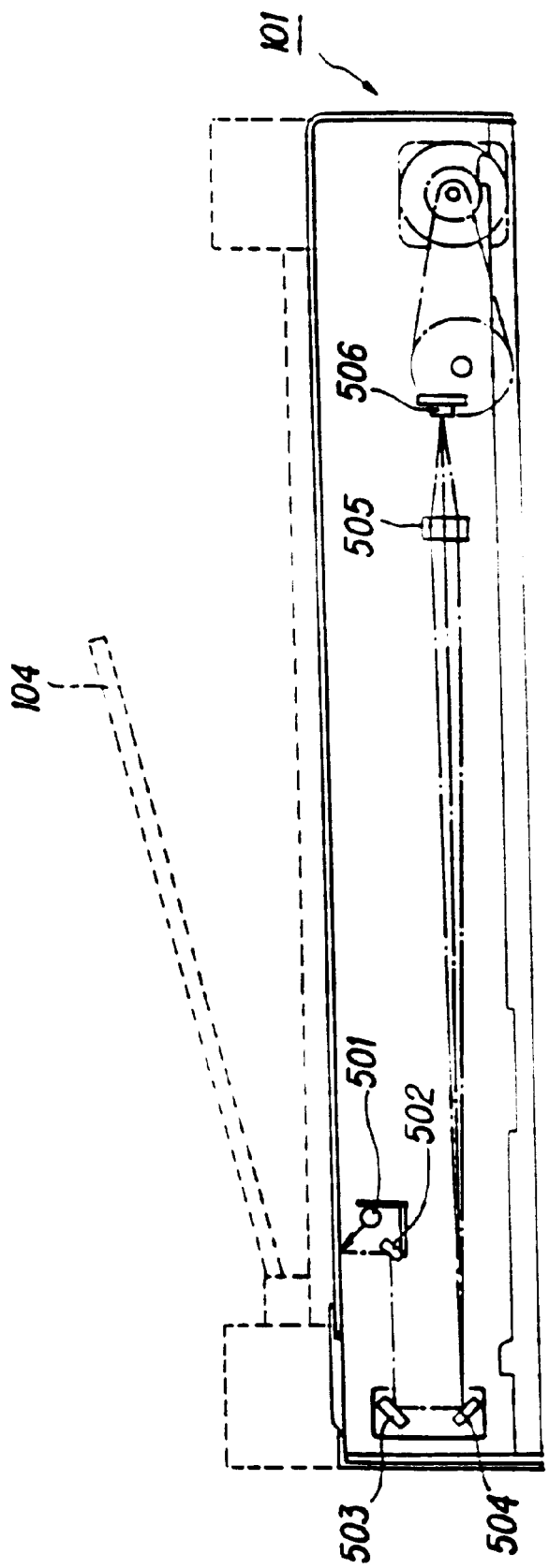
FIG. 5 is a cross-sectional view showing the general configuration of the scanner unit.

FIG. 5 shows the general configuration of the scanner unit 101, in which light rays from a light source 501 are irradiated to a document fed to a prespecified reading position by the ADF 104. Light reflected of f of the document is focused to a CCD 506 (a charge coupled device) via a first mirror 502, a second mirror 503, a third mirror 504, and a fθ lens 505, which is converted to an analog signal by the CCD 506 to generate image data.

Figure 7:
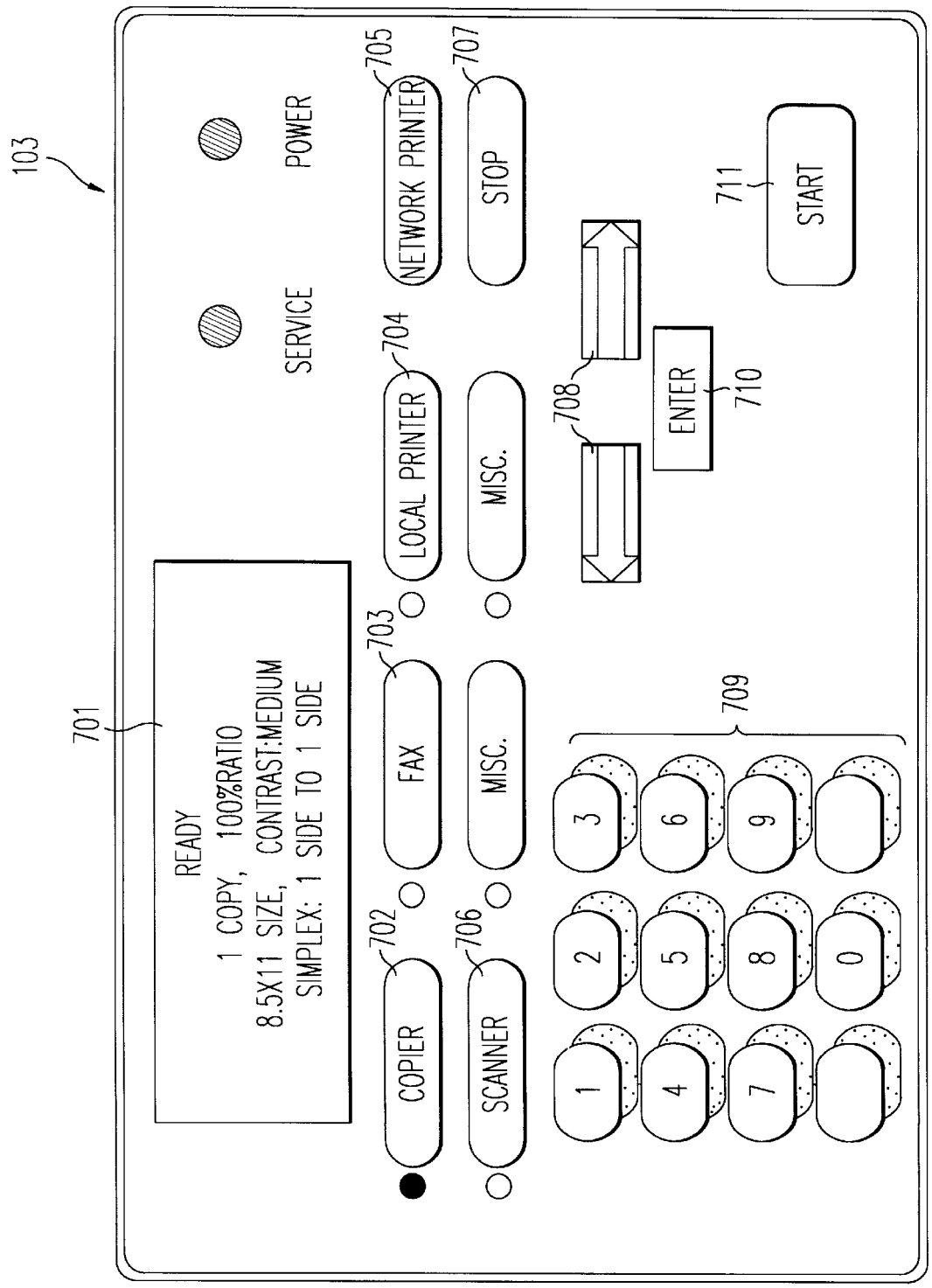
FIG. 7 illustrates the general configuration of an operation display section according to the present invention.

FIG. 7 shows the general configuration of the operation display section 103 located on the scanner unit 101. The operation display section 103 includes a liquid crystal display section 701 for displaying various types of error and status information, and also for displaying a mode which has been set and parameters of the system. The operation display section 103 also includes a copier key 702 for specifying a copy mode which performs a copying function. Copies are generated when performing a copy operation but copies may also be generated when using a facsimile function, local printer function, or a network printer function or the like in the image forming system. A FAX key 703 is used for specifying a facsimile mode (a facsimile function), a local printer key 704 is for specifying a local printer mode (e.g., a direct connection to a host computer); a network printer key 705 for specifying a network printer mode (a network printer function), and a scanner key 706 for specifying a scanner mode. The operation display section 103 further includes a STOP key 707 for stopping (canceling) a copying operation, scroll keys 708 used for scrolling on the display 701 and may be used for changing a displayed parameter, a ten key pad 709, an enter key 710, and a start key 711.

In the system of the present invention, an error in and status of the scanner unit 101 are displayed on the liquid crystal display section 701 of the operation display section 103 provided on the scanner unit 101 in order to improve the system convenience. This allows a user to easily learn of an error in and the status thereof from the displayed details on the liquid crystal display section 701. Further, an error in and status of the printer unit 102 are displayed on both the liquid crystal display section 701 of the operation display section 103 provided on the scanner unit 101 and the LED display section 102*a* provided on the printer unit 102, conveniently giving a user two different locations to determine the status of the printer unit 102.

Figure 8:
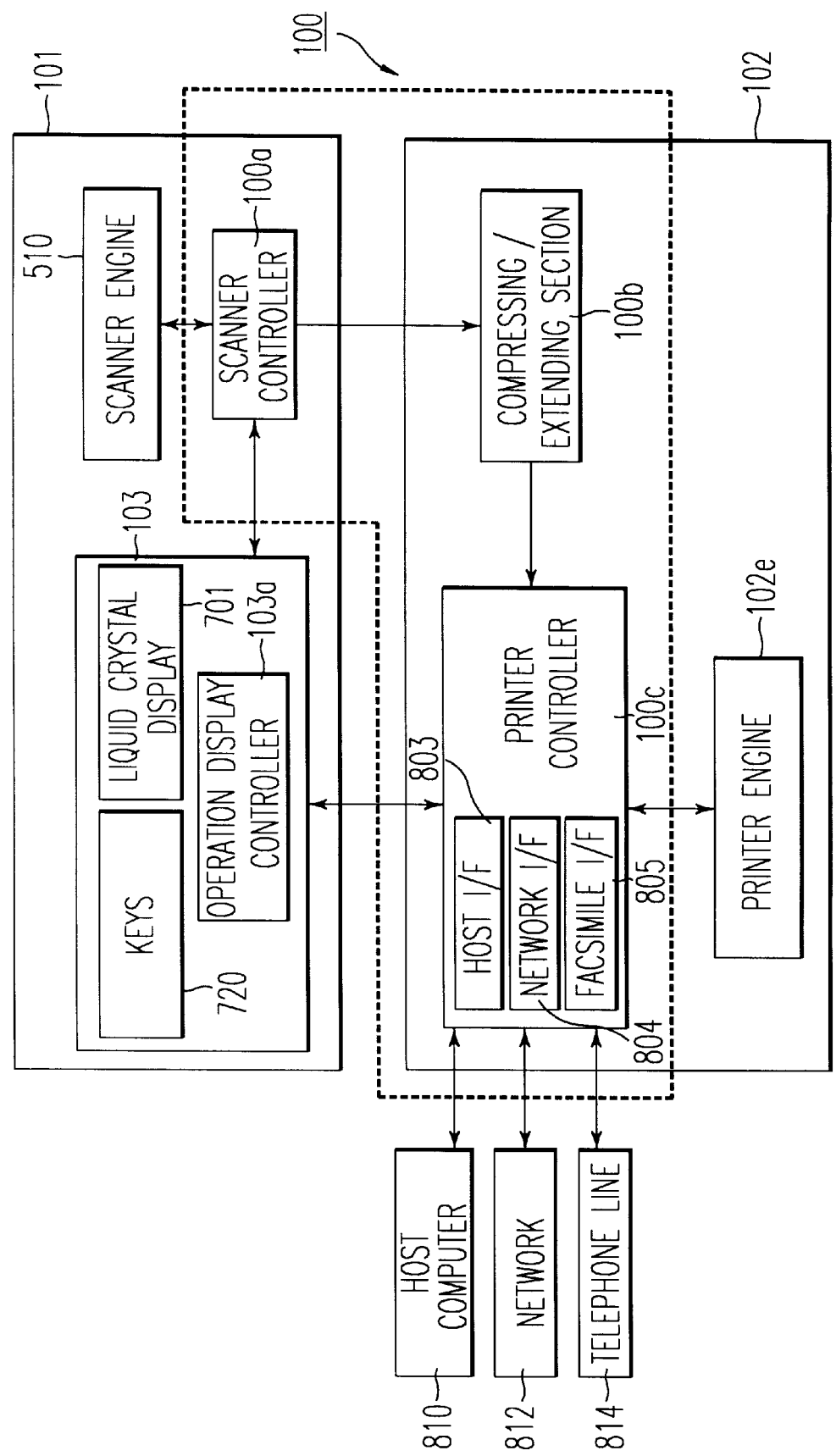
FIG. 8 is a block diagram showing the configuration and location of a control unit according to the present invention.

A control unit 100 for the scanner unit 101 and printer unit 102 is illustrated in FIG. 8. The control unit 100 controls the above-described functions of the system and includes a scanner controller 100*a* for controlling the scanner and executing an amplifying process, a process for converting data from analog to digital (two-valued) data, and a process for shading correction or the like and also for executing driving control of a scanner engine 510 (namely, the scanner components illustrated in FIG. 5), a compressing/extending section 100*b* for receiving image data inputted from the scanner controller 100*a* and compressing and extending the image, and a printer controller 100*c* for executing a smoothing process, a dither process or the like on image data to be printed by the printer unit 102 and executing driving control to a printer engine 102*e* (e.g., the components of the printer unit 102).

The printer controller 100*c* includes a host computer interface 803, a network interface 804 and a facsimile interface 805 for respectively connecting to a host computer 810 such as an IBM compatible personal computer, a network 812 such as an Ethernet Network, and a telephone line 814.

The scanner controller 100*a* is located in the scanner unit 101, and the compressing/extending section 100*b* and the printer controller 100*c* are both located in the printer unit 102. For this reason, regarding the scanner unit 101, it can be regarded as a device substantially equivalent to a stand-alone scanner. This allows a scanner which has previously been purchased to be used with the printer unit. Further, the scanner unit can be used as both a stand-alone scanner and as an integral part of the image forming system. The input keys 720 correspond to the keys 702–711 illustrated in FIG. 7.

FIG. 9 shows an arrangement of the power supply system used by the image forming system. In the printer unit 102, there is a PSU 901 (power source unit) inputting AC current from an external power supply (e.g., an electrical outlet), not illustrated, which converts the AC current to a DC current. The DC current is supplied from the PSU 901 of the printer unit 102 to a power supply circuit 910 of the scanner unit 101. The power supply circuit 910 distributes power throughout the scanner unit 101. The arrangement illustrated in FIG. 9 allows the power source to be eliminated from the scanner unit 101, thus reducing the cost, size, and inconvenience of having two power supplies.

The PSU 901 has an ordinary mode for supplying current to the entire system and a stand-by mode for supplying DC current only to one or more prespecified portions of the system, such as a portion of the control unit 100 and to the operation display section 103 of the scanner unit 101. A switching from this ordinary mode to the stand-by mode is automatically executed by a timer provided in the control unit 100 (not illustrated) when the image forming system is not used for more than a prespecified period of time in order to save energy. Also, a return from the stand-by mode to the ordinary mode is executed by the control unit 100 when a user types on any key of the operation display section 103 or when a control signal is received from an external device such as a signal for specifying the use of the facsimile function, the local printing function, the network printing function or other function which receives data from a source external to the system.

Figure 10A:
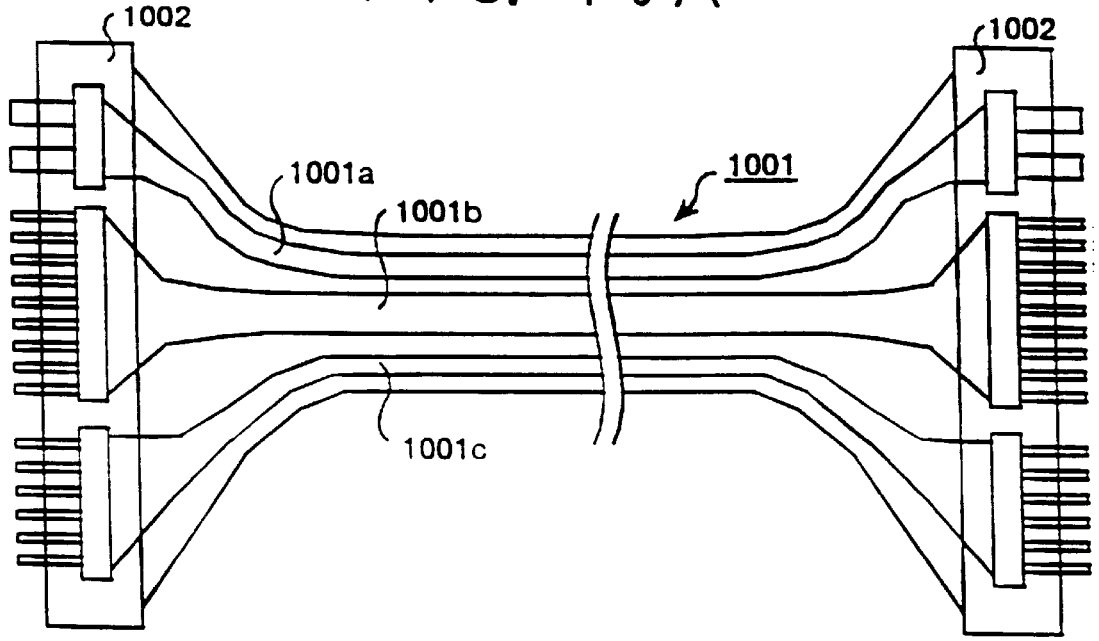
FIG. 10A illustrates a connection cable for connecting the printer unit to the scanner unit.
Figure 10B:
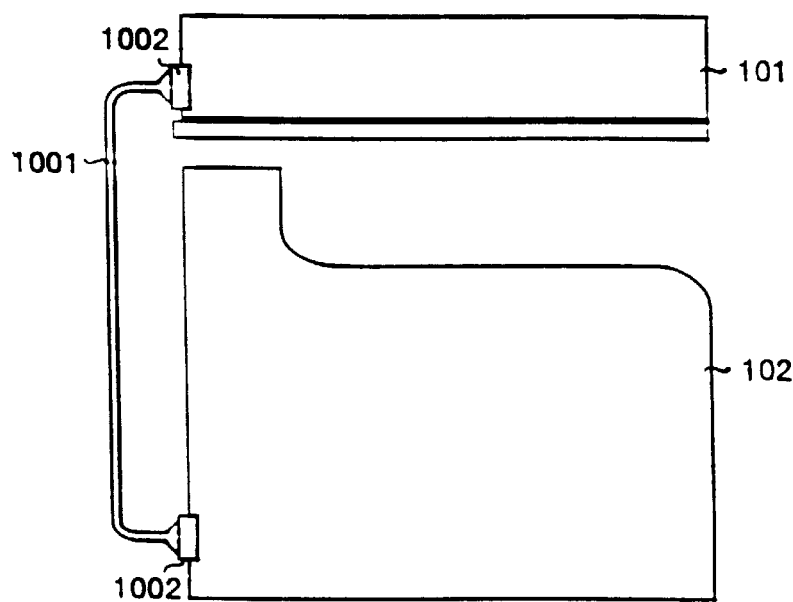
FIG. 10B illustrates the printer unit connected to the scanner unit using the connection cable.

FIG. 10A and FIG. 10B each show a connection cable 1001 and connectors 1002 for connecting the printer unit 102 to the scanner unit 101. The connection cable 1001 includes a power cable 1001*a* for carrying a DC current from the PSU 901 of the printer unit 102 to the power supply circuit 910 of the scanner unit 101, a signal cable 1001*b* for supplying video signals which are considered data signals from the scanner unit 101 to the printer unit 102, and a signal cable 1001*c* for exchanging various types of control signals, in a serial format, between the scanner unit 101 and the printer unit 102 as well as the operation display section 103. These individual cables are integrated into a single cable. The connectors 1002 at each end of the cable 1001 have connector pins corresponding to the individual cables. The use of a single cable containing the individual wires allows the connection between the printer unit 102 and the scanner unit 101 to be easily be executed, and is better as well as simplified in appearance after the connection as compared to the use of individual wires not contained in a single cable. If desired, appropriate shielding is used to prevent stray signals from affecting the information transmitted through the cable.

Next a description of controlling the printer unit 102 for switching between a face-up paper discharge and a face-down paper discharge using the control unit 100 is set forth.

The control unit 100 selects a face-down paper discharge 102*a* if an image is formed on recording paper through any of the facsimile function, local printer function, network printer function, and copying function where the automatic document feeder 104 is not used, for example when a document is directly placed on the glass of scanner unit 101. Alternatively, the control unit 100 selects either the face-up paper discharge tray 102b or face-down paper discharge tray 102c according to a type of the ADF 104 when a document is an image copied using the ADF 104.

For functions such as a facsimile function, a local printer function, a network printer function, and a copying function not using the ADF 104, if image data to be outputted to recording paper extends over a plurality of pages, the image data is fed by the printer unit 102 in ascending page order so that in order to discharge the recorded paper on which images are formed in the proper ascending order, paper is discharged with the surface having image facing downwardly. In order to have the images facing downwardly, the face-down paper discharge tray 102c (or 301a) is selected.

On the other hand, when copying is performed using the ADF 104, in order to discharge paper on which an image is formed in ascending order by page, a determination must be made as to whether a surface having an image formed thereon should be upward or downward according to a type of the ADF 104. Depending on the type of the ADF 104, documents may be fed to the scanner unit 101 in ascending order by page or descending order by page, so that either the face-up paper discharge tray 102b or the face-down paper discharge tray 102c is selected.

Figure 11A:
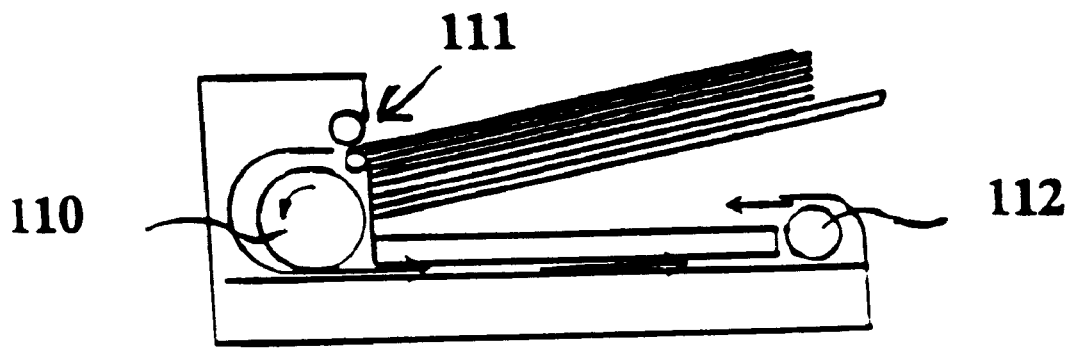
FIG. 11A illustrates a reversing automatic document feeder which feeds paper from the top of a stack.
Figure 11B:
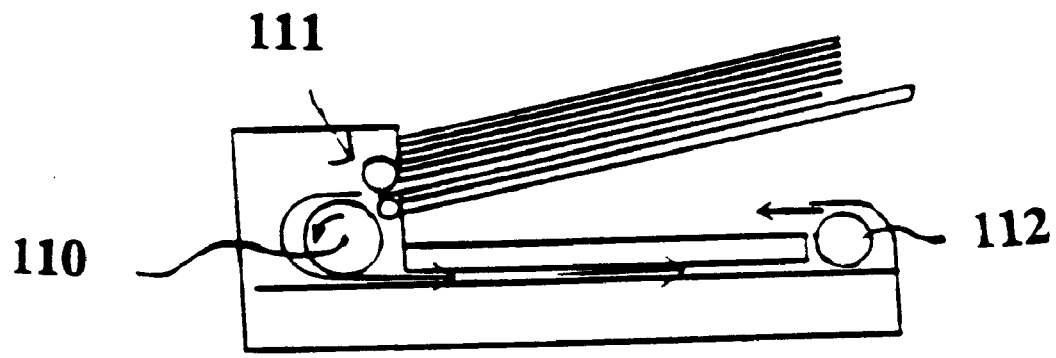
FIG. 11B illustrates a reversing automatic document feeder which feeds paper from the bottom of a stack.

Next, a relation between a type of the ADF 104 and the orientation of ejected pages will be explained with reference to FIGS. 11A through 12B. There are two types of automatic document feeders; a type where, as shown in FIG. 11A and FIG. 11B, a document is set on a surface having the image face upwardly and is fed using feeding rollers 111 to the scanner unit 101 by reversing, using a first reversing roller 110, the document during feeding (a reversed feeding type). After scanning, the page is reversed again using a second reversing roller 112.

Another type of automatic document feeder is a straight feeding type shown in FIG. 12A and FIG. 12B in which a document is set having the images face downwardly and pages are fed to the scanner unit 101 without reversing the document by feeding rollers 120 during feeding. The pages are ejected using the reversing roller 122.

There are two types in each of the reversed feeding type and straight feeding type automatic document feeders; type one is a downward feeding type where pages are fed from the top of a stack in a downward order (FIG. 11A and FIG. 12A) and the other type is an upward feeding type where pages are fed from the bottom of a stack in an upward order (FIG. 11B and FIG. 12B).

Whether printed pages should be ejected facing up or down depends on which of the four types of automatic document feeders is being used. Table 1 below indicates that for the feeders illustrated in FIGS. 11A and 12B, printed pages should be ejected facing down and for the feeders illustrated in FIGS. 11B and 12A, printed pages should be ejected facing up.

TABLE 1

| FIG. | PAPER PATH | FEEDING TYPE | ORDER OF FED PAGES | PRINTED PAPER DISCHARGE |
|---|---|---|---|---|
| 11A | REVERSED | UPWARD | ASCENDING | DOWN |
| 11B | REVERSED | DOWNWARD | DESCENDING | UP |
| 12A | STRAIGHT | UPWARD | DESCENDING | UP |
| 12B | STRAIGHT | DOWNWARD | ASCENDING | DOWN |

Figure 13:
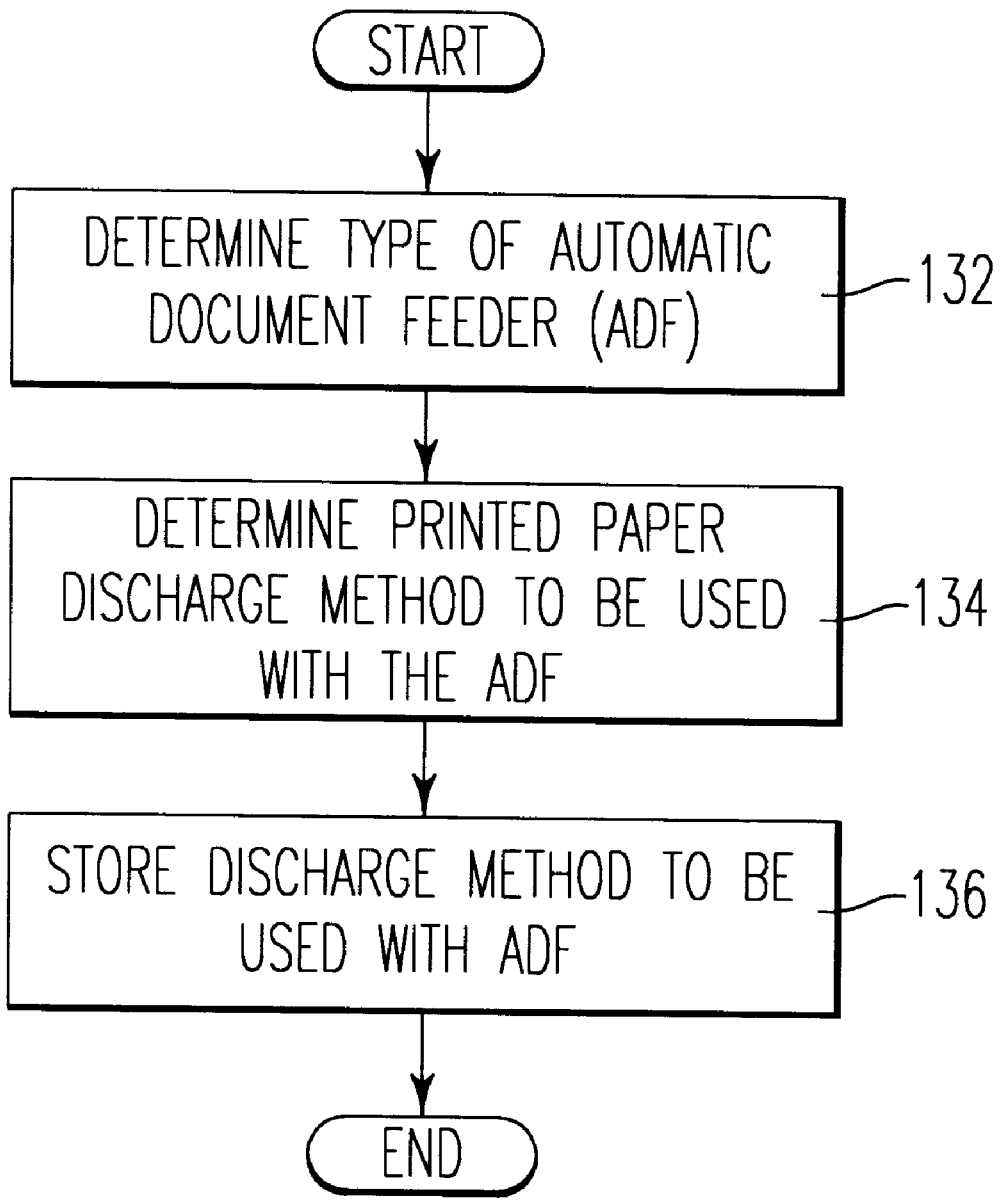
FIG. 13 is a flowchart for determining the orientation of discharged pages which have been printed, depending on the type of automatic document feeder.

FIG. 13 is a flowchart for determining the orientation of discharged pages which have been printed, depending on the type of automatic document feeder used by the image forming system. This process is performed when the system is being set up or a different automatic document feeder is installed into the system. In FIG. 13, after starting, step 132 determines the type of the automatic document feeder. The type may be one of the four automatic document feeders illustrated in FIGS. 11A–12B, but it is possible for other types of automatic document feeders to be used. It is possible for the type of automatic document feeder to be automatically determined without user intervention. This can be accomplished by physical or electrical characteristics of the automatic document feeder which can be detected by a sensor or circuitry (not illustrated) on the scanner unit 101. For example, switches similar to switches conventionally used to determine a type of feed paper tray of a laser printer can be used to detect shapes such as protrusions or indentations of the ADF. Alternatively, LEDs and light sensors may be used which sense characteristics of the ADF. As a further alternative, a non-volatile memory device may be contained in the ADF which stores a type of the ADF. Alternatively, a user will enter the type of automatic document feeder through the operation display section 103 (user interface) on the scanner unit 101.

After the type of automatic document feeder has been determined in step 132, step 134 determines which paper discharge method should be used with the automatic document feeder and whether printed pages should be discharged face-up or face-down. This step can be accomplished by looking up a value in a table such as Table 1 above stored in a non-volatile memory of the control unit. After the printed paper discharge method has been determined in step 134, step 136 stores the discharge method to be used with the automatic document feeder in a non-volatile memory (not illustrated) such as a RAM having a battery backup, an EPROM, an EEPROM, or a flash memory, for example. The process of FIG. 13 then ends.

Figure 14:
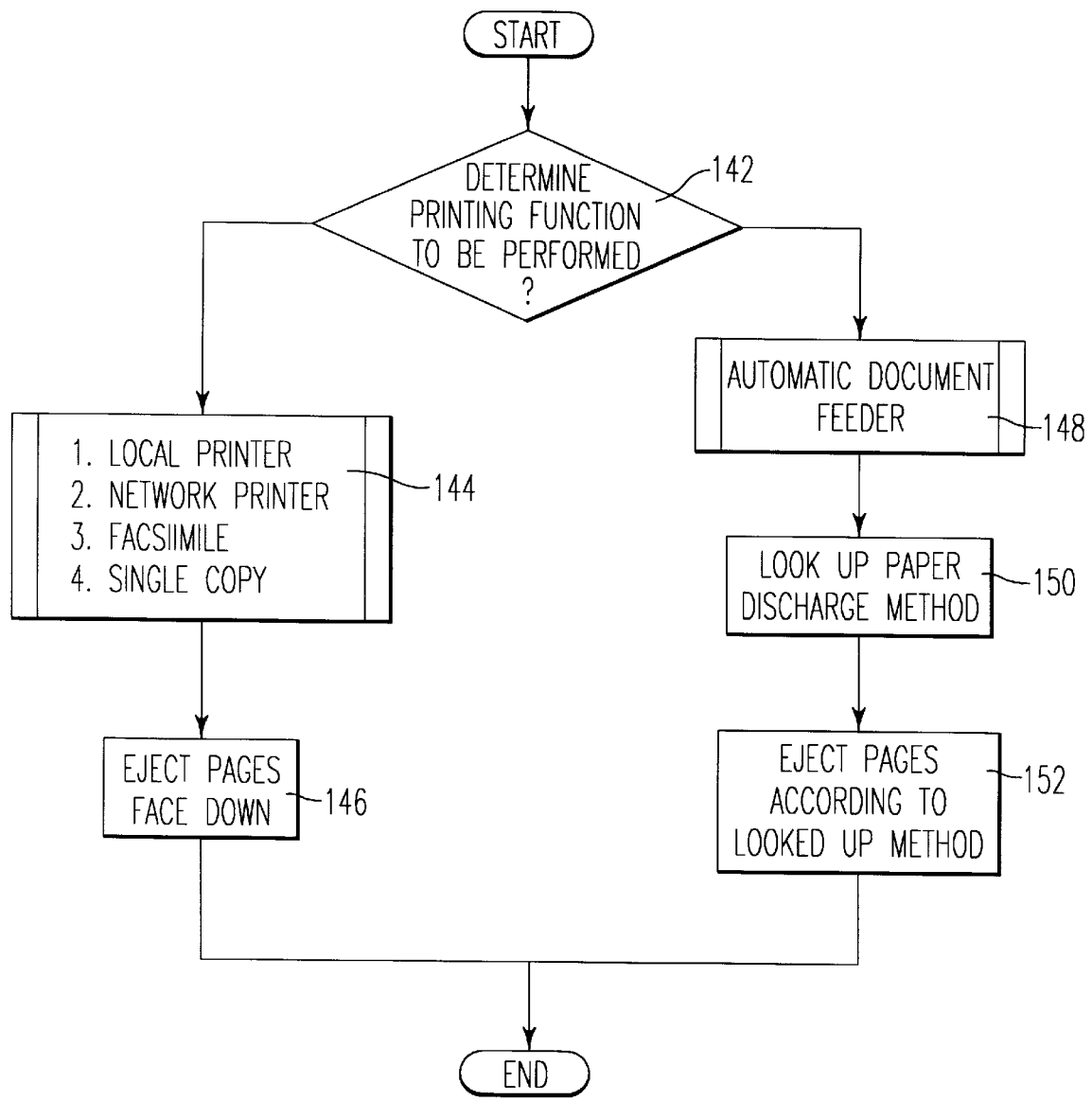
FIG. 14 is a flowchart for determining the orientation of discharged pages, depending on the source of the printed information.

When the printer unit is being used, it must be determined whether ejected pages are to be ejected facing upwardly or downwardly. This determination can be made using the flowchart illustrated in FIG. 14. In FIG. 14, after starting, step 142 determines the printing function to be performed. For example, the printing function can be the function of a local printer, a network printer, a facsimile machine, or a single sheet copier which does not use the automatic document feeder, as illustrated in step 144. If this is the case, pages are ejected facing down to either of the paper trays 102c or 301a, as indicated in step 146. Alternatively, if the printing function uses an automatic document feeder as indicated in step 148, step 150 looks up the discharge method which is to be used with the automatic document feeder which was stored in step 136 of the flowchart of FIG. 13. Printed pages are subsequently ejected in step 152 according to the method which was looked up in step 150. The process of FIG. 14 then ends.

By ejecting the pages having the proper orientation, e.g., facing up or down, there is no need to rearrange sheets which have been outputted by the printer unit 102, thus increasing the convenience and workability of the system.

The present invention uses one or more microcomputers or control boards in each of the controllers so that the controllers can perform their desired functions. These microcomputers or control boards may be implemented using conventional microprocessors or a conventional general purpose digital computer programmed according to the teachings of the present application, as will be appropriate to those skilled in the art. Appropriate software coding can readily be prepared by skilled programmers based on the teachings of the present disclosure, as will be apparent to those skilled in the software art. The microprocessors will have connected thereto using a bus, a RAM for storing working variables, and one or more non-volatile memories such as a ROM, EPROM, EEPROM, flash memory, or a battery backed-up RAM which stores system parameters and control programs. The invention may also be implemented by the preparation of applications specific integrated circuits or by interconnecting an appropriate network of conventional component circuits, as will be readily apparent to those skilled in the art.

By having the printer unit and scanner unit accommodated in their own housing, the system becomes modular, allowing the user to utilize the most appropriate scanner unit and printer unit, depending on budget and performance constraints. The above-described features of the invention allow a better and more efficient use of such a modular system. For example, different types of automatic document feeders may be used with the system. In order to have the modular system easily set-up and modified at the installed location, the invention allows the paper discharge method (face-up or face-down) of the printer unit to be automatically set in accordance with configuration of the modular system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed as new and desired to be secured by Letters Patent of the United States:

1. An image forming system, comprising:
    a printer unit, including:
        a housing;
        a printer engine disposed within the housing of the printer unit;
        a printer controller, disposed within the housing of the printer unit, which is connected to the printer engine and controls the printer engine; and
        a power supply which generates DC current,
    a scanner unit, including:
        a housing which is different from the housing of the printer unit;
        a scanner engine disposed within the housing of the scanner unit; and
        a scanner controller disposed within the housing of the scanner unit which is connected to the scanner engine and controls the scanner engine, and
    a cable for connecting the printer unit and the scanner unit, including:
        power supply wires, for supplying the DC current from the power supply of the printer unit to the scanner unit, the DC current powering the scanner unit;
        a signal cable for supplying video signals from the scanner unit to the printer unit; and
        signal wires for exchanging control signals in a serial format between the printer unit and the scanner unit.

2. An image forming system according to claim 1, wherein the cable comprises:
    a single integrated cable having the power supply wires, the signal cable, and the signal wires.

3. An image forming system according to claim 2, wherein the cable comprises:
    a single connector on each end thereof.

4. An image forming system according to claim 1, wherein:

the scanner unit receives DC current which is supplied from a conversion of AC current only from the power supply of the printer unit.

5. A system according to claim 1, further comprising:
    a single integrated cable connected between the printer unit and the scanner unit including the power supply wires and the signal wires, the single integrated cable including a first connector at a first end thereof which plugs into the printer unit, the first connector having a first set of contact terminals which correspond to the power supply wires and a second set of contact terminals which correspond to the signal wires, the cable further including a second connector at a second end thereof which plugs into the scanner unit, the second connector having a first set of contact terminals which correspond to the power supply wires and a second set of contact terminals which correspond to the signal wires.

6. A system according to claim 5, wherein the single integrated cable further comprises:
    a third set of contact terminals at the first connector and a corresponding set of third contact terminals at the second connector, the third sets of contact terminals each connected to the signal cable which supplies the video signals.

7. An image forming system, comprising:
    a printer unit, including:
        a housing means for housing components of the printer unit;
        a printer engine means, disposed within the housing of the printer unit, for printing images;
        a printer controller, disposed within the housing means of the printer unit and connected to the printer engine means, for controlling the printer engine means; and
        a power supply means for generating DC current,
    a scanner unit, including:
        a housing means for housing components of the scanner unit which is different from the housing means of the printer unit;
        a scanner engine means, disposed within the housing means of the scanner unit, for generating images by scanning; and
        a scanner controller means, disposed within the housing means of the scanner unit and connected to the scanner engine, for controlling the scanner engine, and
    a cable means for connecting the printer unit and the scanner unit, including:
        power supply wire means for supplying the DC current from the power supply means of the printer unit to the scanner unit, the DC current powering the scanner unit;
        a signal cable means for supplying video signals from the scanner unit to the printer unit; and
        signal wire means for exchanging control signals in a serial format between the printer unit and the scanner unit.

8. An image forming system according to claim 7, wherein the cable means comprises:
    a single integrated cable means having the power supply wire means, the signal cable means, and the signal wire means.

9. An image forming system according to claim 8, wherein the cable means comprises:
    a single connector means on each end thereof.

10. An image forming system according to claim 7, wherein:

the scanner unit receives DC current which is supplied from a conversion of AC current only from the power supply means of the printer unit.

11. A system according to claim 7, further comprising:

a single integrated cable means connected between the printer unit and the scanner unit including the power supply wire means and the signal wire means, the single integrated cable including a first connector means at a first end thereof which plugs into the printer unit, the first connector having a first set of contact terminal means which correspond to the power supply wires and a second set of contact terminal means which correspond to the signal wires, the cable further including a second connector means at a second end thereof which plugs into the scanner unit, the second connector means having a first set of contact terminal means which correspond to the power supply wire means and a second set of contact terminal means which correspond to the signal wire means.

12. A system according to claim 11, wherein the single integrated cable means further comprises:

a third set of contact terminals means at the first connector means and a corresponding set of third contact terminals at the second connector, the third sets of contact terminal means each connected to the signal cable means which supplies the video signals.

* * * * *